US008118056B2

(12) United States Patent
Klehr et al.

(10) Patent No.: US 8,118,056 B2
(45) Date of Patent: Feb. 21, 2012

(54) MIXING DEVICE WITH VALVE DISKS

(75) Inventors: Stefan Klehr, Rheinzabern (DE); Robert Sendner, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 717 days.

(21) Appl. No.: 12/284,691

(22) Filed: Sep. 24, 2008

(65) Prior Publication Data

US 2009/0101211 A1 Apr. 23, 2009

(30) Foreign Application Priority Data

Sep. 24, 2007 (EP) .................................... 07018752

(51) Int. Cl.
*F16K 11/06* (2006.01)

(52) U.S. Cl. .................................. 137/625.18; 137/597

(58) Field of Classification Search ............. 137/625.18, 137/625.19, 84, 88, 625.41, 625.46, 597
See application file for complete search history.

(56) References Cited

U.S. PATENT DOCUMENTS

| | | | | |
|---|---|---|---|---|
| 2,384,318 | A * | 9/1945 | Le Bleu | 137/625.11 |
| 3,889,878 | A * | 6/1975 | Evans | 237/8 R |
| 4,827,980 | A * | 5/1989 | Mazzei et al. | 137/625.46 |
| 5,983,918 | A | 11/1999 | Chang | |
| 6,237,622 | B1 | 5/2001 | Cook et al. | |
| 6,352,105 | B1 * | 3/2002 | Serratto | 165/221 |
| 6,550,497 | B2 * | 4/2003 | Thiele et al. | 137/625.46 |
| 6,916,113 | B2 * | 7/2005 | Van de Goor et al. | 366/108 |
| 2005/0019803 | A1 | 1/2005 | Chen | |

FOREIGN PATENT DOCUMENTS

| | | | |
|---|---|---|---|
| DE | 35 07 995 | A1 | 9/1986 |
| EP | 0 304 537 | A2 | 3/1989 |
| WO | WO 2005/106246 | A1 | 11/2005 |

* cited by examiner

*Primary Examiner* — John Fox

(57) ABSTRACT

The invention relates to a mixing device for mixing substances with a valve control disk and a fixed valve seat disk having at least two groups of openings each of which consists of at least three through openings. A first opening is an inlet for a substance, a second opening connects to a mixing path and a third opening bridges the mixing path. The valve control disk has a first and second recess and is arranged parallel to the valve seat disk and a flow is realized via the first recess between the first and second opening and via the second recess between the first and third opening. The first opening is superimposed by the first and second recesses and a superimposed surface area remains constant. The total superimposed surfaces of the first openings by the first recesses and by the second recesses are also constant.

8 Claims, 6 Drawing Sheets

LABELED OPENINGS OF VALVE CONTROL DISK 1

LABELED OPENINGS OF VALVE SEAT DISK 2

MIXING DEVICE WITH VALVE DISKS

CROSS REFERENCE TO RELATED APPLICATIONS

This application claims priority of European application No. 07018752.1 filed Sep. 24, 2007, which is incorporated by reference herein in its entirety.

FIELD OF THE INVENTION

The invention relates to a mixing device for mixing substances, especially liquids or gases with different temperatures, with a moveable, adjustable valve control disk and at least one fixed valve seat disk.

BACKGROUND OF THE INVENTION

With a mixing system, a mixing module, for example, is supplied through two separate circuits in each case with a substance to be mixed. In this way, the mixing module takes a proportion of the different substances to be mixed in order to enable a mixed substance with a required character to be produced. Several valves for distributing and conducting or mixing the various substances are required for this purpose. This makes the mixing system or the mixing module complicated and not cost effective. The control of the mixing system is impractical due to the use of a large number of valves. Furthermore, to protect a mixing module or compensate for the circuits, a mixing path in the mixing system is frequently bridged by one or more bypasses though which a substance to be mixed is passed in each case. The bypass is normally controlled by an extra manual rotary valve and is therefore not variable.

A multivalve has also been developed which combines two valves to form a single valve. The multivalve is provided with two fixed bores, each for a bypass. Although this enables the number of valves used to be reduced, a bypass designed in this way is also non-adjustable. It is desirable for a mixing system to have a variable bypass, with the bypass being automatically adjustable as a function of the mixture settings. The greater the flow of a substance for mixing in a mixing path of the mixing system, the less of the substance flows through a bypass and vice versa. Furthermore, more of the substance automatically flows in the mixing path for mixing purposes if less of the other substance, or substances, flows in this mixing path.

SUMMARY OF THE INVENTION

The object of the invention is to realize a mixing device with a bypass adjustment for mixing substances, especially liquids or gases at various temperatures.

The object is achieved in accordance with the invention by a mixing device with the features of the independent claims. The dependent claims relate to advantageous developments and embodiments of the invention.

The invention is based on the knowledge that the flow of a substance through an opening can be changed as a function of the size of the cross-section of the opening. Therefore, a mixing device is shown for mixing substances, especially liquids or gases at different temperatures, with a moveable, adjustable valve control disk and at least one fixed valve seat disk, with the valve seat disk having at least two opening groups, each of which consists of at least three through openings. Furthermore, a first opening is provided as an inlet opening or an outlet opening for a substance, a second opening is provided for connecting to a mixing path for the substances and a third opening is provided for bridging the mixing path. The valve control disk is provided on at least one side with a first recess and a second recess. By means of such recesses, a passage for substances between the openings, i.e. between the first, the second and the third opening, of the valve seat disk can be realized for each opening group of the valve seat disk. The valve control disk is arranged parallel to the valve seat disk so that at each opening group a flow is possible, via the first recess, between the first opening and the second opening and via a second recess a flow is possible between the first opening and the third opening. To form a passage, the first and second recesses are, for example, superimposed in each case over the first opening. To control the mixture, the valve control disk is to be adjusted relative to the valve seat disk so that for each group of openings the total superimposed surfaces of the first opening remain constant. In this way, the total surfaces, on which the first recesses are superimposed in each case, of the first openings of the complete group of openings remain constant and the total of the respective surfaces superimposed by the second recesses likewise remain constant. With this mixing device, a variable bypass can be realized in such a way that the passage of a substance in the bypass can be changed as a function of its passage in the mixing path. By adjusting the valve control disk, a passage cross-section, i.e. the superimposed surface of the first opening of the valve seat disk and of the first or second recess of the valve control disk can be changed and the relative proportion of substances to be mixed can thus be controlled. Furthermore, the bypass for the mixing path can be automatically adjusted as a function of the settings of the valve control disk. The valve control disk and the valve seat disk each usually consists of a round disk, with the valve control disk being rotatable relative to the valve seat disk to set the mixing device. It can also be designed in a different shape, e.g. as a rectangle, and the valve control disk can then be pulled or pushed relative to the valve seat disk.

According to an advantageous embodiment of the invention, the mixing device consists of a valve control disk and two valve seat disks, with the valve control disk being arranged between, and parallel to, the valve seat disks. The valve control disk is provided on each side with a first recess and a second recess. For each group of openings of the two valve seat disks, the first recess is provided to form a passage between the first opening and the second opening, with the second recess being provided to form a passage between the first opening and the third opening. Two of the second recesses in each case, each of which is arranged on both sides of the valve control disk, are connected to each other by a channel to enable a flow between the two valve seat disks. A mixing device designed in this way can be used on its own in a mixing system to create a mixing path, instead of using the two aforementioned mixing devices, each of which has only one valve seat disk.

Advantageously, the two valve seat disks are of identical construction and the first recesses and second recesses can be symmetrically arranged on both sides of the valve control disk. This enables the mixing device to be easily constructed and controlled.

According to an advantageous embodiment of the invention, the mixing device has at least two shut-off positions. If the mixing device is set to one of the shut-off positions, the mixing of the substances can be ended or avoided, i.e. the substances no longer flow in the mixing paths but instead they each flow completely in the bypasses. Because at least two shut-off settings are available in the mixing device, it is not necessary to set the mixing device to a specific state in order to separate the mixing of the substances. The mixing can be quickly or easily separated by setting the mixing device to a state corresponding to one of the shut-off positions of this mixing device.

In a mixing system, two mixing devices, each of which has only one valve seat disk, can be used to create a mixing path in such a way that a first mixing device can be provided as an inlet (supply valve) and a second mixing valve can be provided as an outlet (return valve), with the second openings of the first mixing device each being connected as an inlet opening and the second openings of the second mixing device each being connected as an outlet opening for a substance. To bridge the mixing path, the third openings of the first mixing device are each connected to the corresponding third openings of the second mixing device. A mixing path and its bypass can in this way be realized by using the two mixing devices. The mixing system can thus be cost effectively constructed because only two mixing devices/valves are used in this case. The substances to be mixed are fed from the second openings of the supply valve into the mixing path and then mixed together. The mixed substances are drawn off via the second openings of the valve seat disk and with the aid of the first recesses of the valve control disk through the first openings of the valve seat disk of the return valve. The substances supplied through the first openings of the supply valve but not fed in for mixing are passed, with the aid of the second recesses in each case, from the third openings of the supply valve through the bypass into the third openings of the return valve and are then passed on via the second recesses of the valve control disk through the first openings of the return valve for bridging the mixing path.

Alternatively, a mixing device which has one valve control disk and two valve seat disks can be used in the aforementioned mixing system for the creation of a mixing path. In this case, the mixing device is connected for the creation of a mixing path in such a way that the first valve seat disk is provided as an inlet (supply disk) and the second valve seat disk as an outlet (return disk) of the mixing path. The first openings and the third openings of the supply disk are each connected as the inlet opening for a substance. The second openings of the supply disk are each provided as a substance supply opening of the mixing path, with the second openings of the return disk each being provided as an outlet opening for a mixed substance. The first openings and the third openings of the return disk each also serve as an outlet opening. The mixture path is bridged in that the substances to be mixed are each fed to the third openings of the supply disk and then fed via two second recesses, which are located opposite each other on both sides of the valve control disk and connected by a channel, through the first and/or third openings of the return disk. A mixture path and one or more bypasses can thus be enabled by means of a single mixing device, without a further valve being required.

BRIEF DESCRIPTION OF THE DRAWINGS

The invention is described in more detail in the following with the aid of the exemplary embodiments shown in the diagrams, in which.

DETAILED DESCRIPTION OF THE INVENTION

Figure 1:
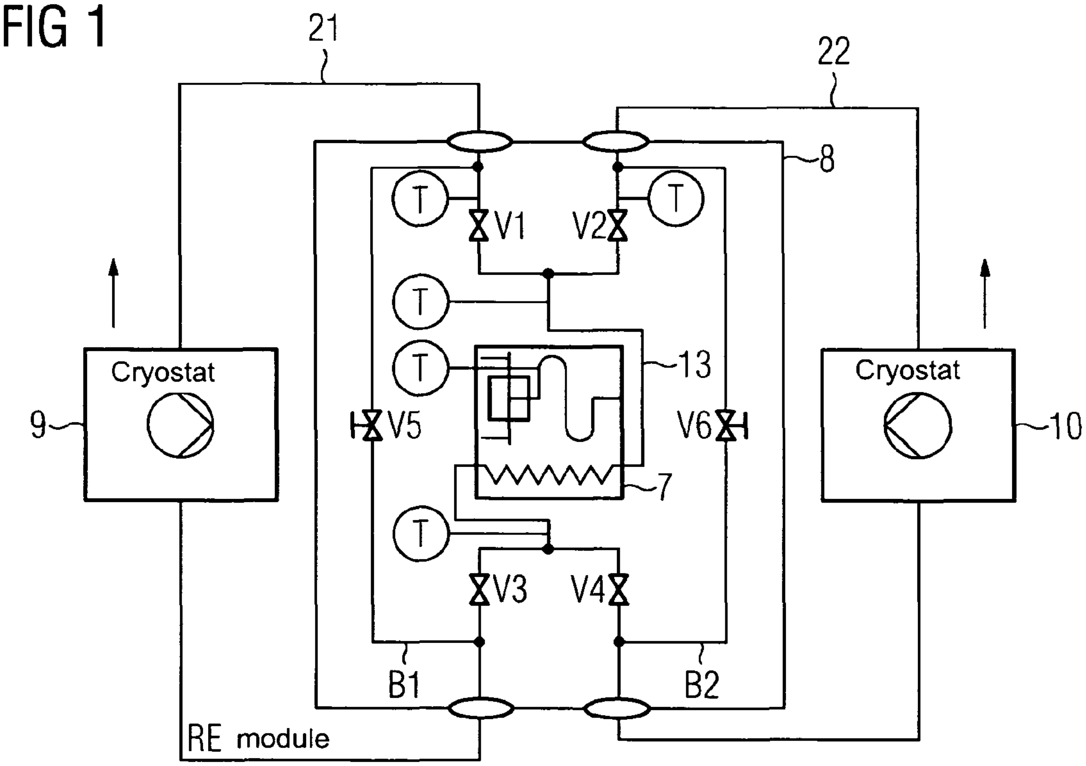
FIG. 1 shows a mixing system with conventional valves.

FIG. 1 shows a microreaction system with a reaction module 8, with the reaction module 8 having a reactor 7 and being supplied via two liquid circles 21, 22 which are separately temperature-conditioned. In this process, one liquid circuit 21 is provided for heating and another liquid circuit 22 for cooling. A chemical reaction takes place in the reactor 7, which is to be carried out at a constant temperature, usually at a high temperature. For this purpose, for example, hot water and cold water are mixed to provide a suitable temperature through a mixing path 13 and then supplied to the reactor 7 in order to guarantee the chemical reaction. Both liquid circuits 21, 22 are each supplied from two cryostats 9, 10, each of which conditions the liquid circuit to a constant temperature. The cryostat 9, 10 can only output its heating or cooling power if the circuit 21, 22 can supply an adequate flow of water. The higher a flow, the more efficient a cryostat. Therefore, the more constant a flow, the more stable the temperature conditioning by a cryostat.

At the inlet and outlet of the reaction module 8 are two actuating elements, each of which is based on two valves V1 and V2 or V3 and V4. Via valves V1 and V2, the reaction module 8 accepts its share of the hot and cold water supplied to it, in order to achieve a desired temperature by mixing. The mixed water is supplied via the mixing path 13 to the reactor 7 for temperature control of the chemical reaction and is then divided between valves V3 and V4 and is in each case returned to the circuits 21, 22.

A bridging consisting of a hot bypass B1 and a cold bypass B2 is formed for the mixing path 13. This ensures that the cryostats 9, 10 each receive a constant minimum flow. For each bypass, the reaction module 8 has a valve V5, V6, which is usually a manual rotary valve. Such valves can, however, not be automatically controlled according to a specific relative proportion in which the hot water and cold water are mixed, i.e. the flow of water through the bypass can, for example, only be manually controlled. Therefore, the bypasses B1, B2 are not variable. Even when the valve V5, V6 are each embodied as a multivalve together with the actuating elements V1, V2 and V3, V4, valves V5, V6 are still realized only once in the form of two fixed bores. Although in this case the number of valves that are used can be reduced, the bypass thus formed is still non-variable.

A shown in FIG. 1, the reaction module 8 must have six valves V1-V6. Of these, there are two non-variable valves V5, V6 whose purpose is to ensure the minimum flow to the cryostats 9, 10 in advance. The inlet or return flow of the temperature-controlled water can be controlled by valves V1, V4. Depending on the operating state of the microreactions system, the cryostats 9, 10 receive different amounts of flow because the total flow at the cryostats 9, 10 varies due to the combination of non-variable bypass flow and variable temperature-conditioned flow. Therefore, the cryostats 9, 10 are met with different amounts of water flow of their temperature-conditioned media. In general, however, the cryostats 9, 10 should have a flow which is as constant as possible in all operating states. Therefore, the bypasses, B1, B2 must be adjusted during the temperature control so that the total flow at the cryostats 9, 10 is constant.

Furthermore, due to the many valves, this microreaction system also requires a large number of stepper motors. Associated with this is the danger of the valve settings drifting relative to each other due to step losses in the stepper motors. The number of valves and stepper motors also results in a high space requirement and high costs.

Figure 2A:
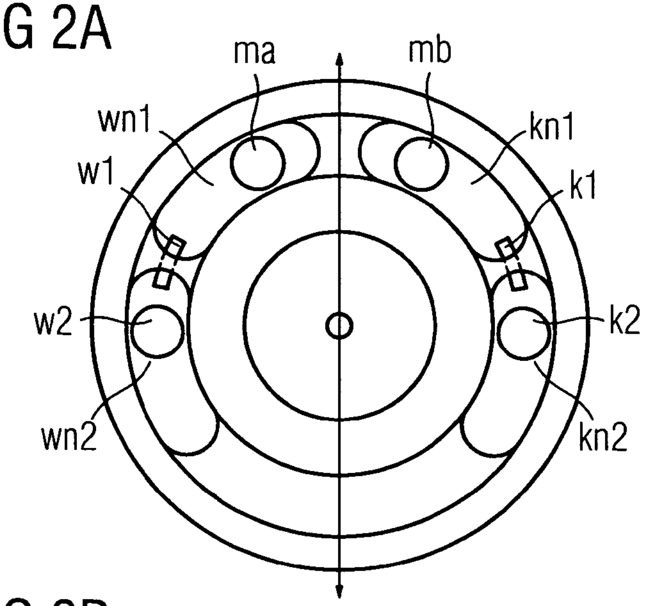
FIG. 2 shows an inventive mixing device with a valve control disk and a valve seat disk.
Figure 2B:
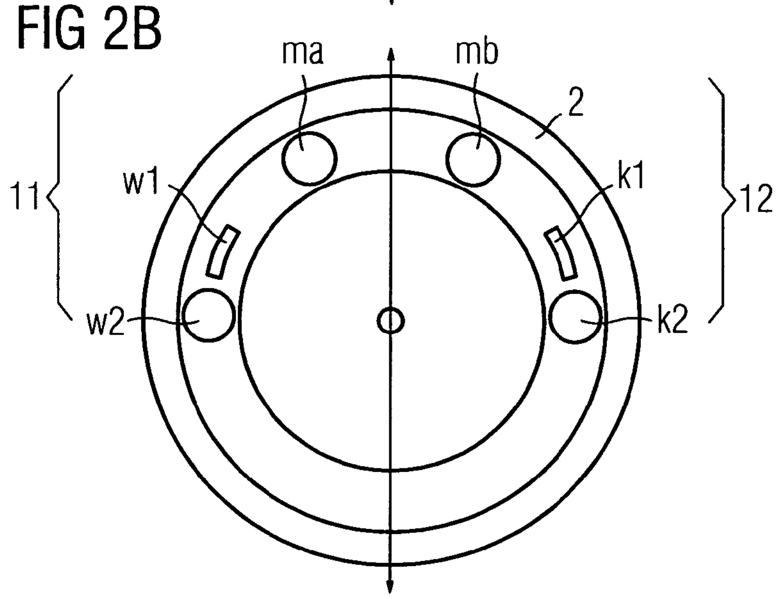
Figure 2C:
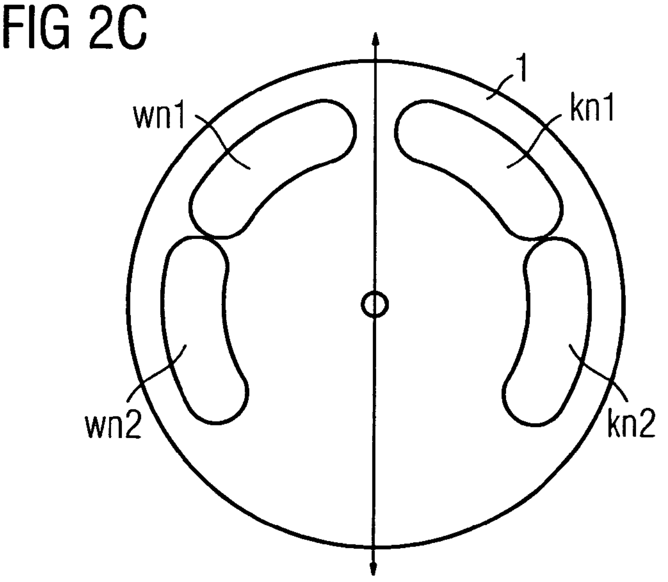
Figure 3A:
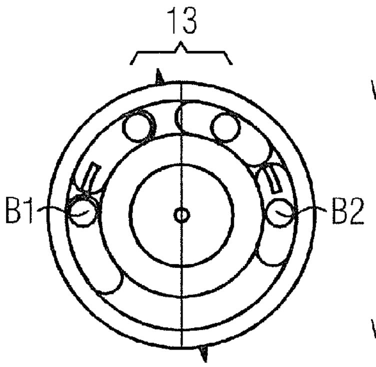
FIG. 3 shows the different settings of the valve control disk of the mixing device according to FIG. 2.
Figure 3B:
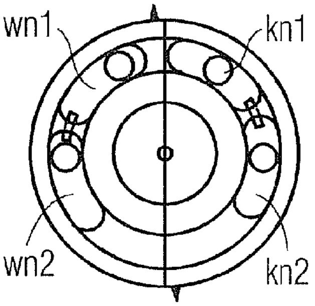
Figure 3C:
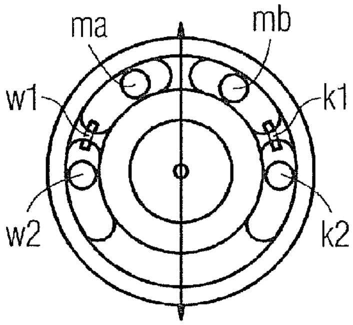
Figure 3D:
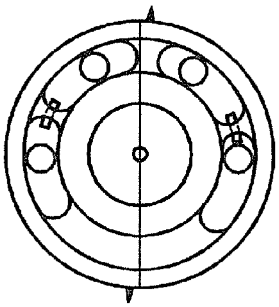
Figure 3E:
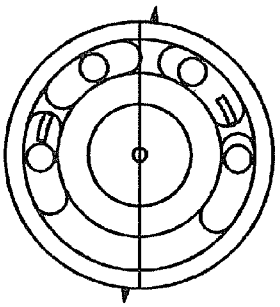
Figure 3F:
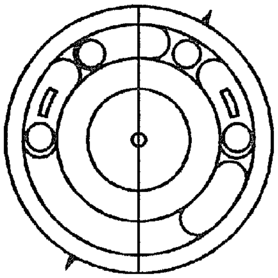
Figure 3G:
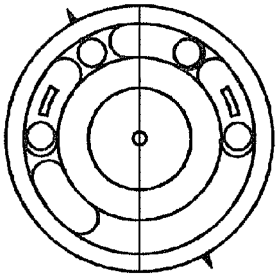

FIG. 2 shows a mixing device (FIG. 2*a*) consisting of a valve control disk 1 (FIG. 2*c*) and a valve seat disk 2 (FIG. 2*b*). This mixing device can be constructed from plastic or a ceramic and usually consists of round disks, with the round disks being parallel to each other and being arranged coaxially. When adjusting the mixing device, e.g. for temperature control, the valve control disk 1 is rotated, e.g. mechanically, relative to the valve seat disk 2. A mixing device of this design can also be easily and readily connected to a water pipe.

The valve seat disk 2 has two groups of openings 11, 12 each of which is provided for the control and passage of hot water and cold water. Furthermore, each group of openings includes a first opening w1, k1, a second opening ma, mb for creating a mixing path 13 and a third opening w2, k2 for bridging the mixing path. The valve control disk 1 in FIG. 2*b* is provided with four trough-shaped recesses on one side only. For the group of openings 11 of the valve seat disk 1, a first recess wn1 is provided for forming a passage for hot water between the first opening w1 and the second opening ma of the valve seat disk 2, with a second recess wn2 being provided for forming a passage for hot water between the first opening w1 and the third opening w2 of the valve seat disk 2. Accordingly, a first recess kn1 is provided for the group of openings 12 of the valve seat disk 1 for forming a passage for cold water between the first opening k1 and the second opening mb of the valve seat disk 2, with a second recess kn2 being provided for forming a passage for cold water between the first opening k1 and the third opening k2 of the valve seat disk 2. If, for example, the first recess wn1 and the first opening w1 are set to overlap each other, a hot water flow from the first opening w1 to the second opening ma is possible. The greater the overlapped surface of the first opening w1, the more hot water flows in a time unit through the first recess wn1 and out from the second opening ma.

FIG. 3 shows the various adjustment positions of the valve control disk 1 relative to the valve seat disk 2 of the mixing device shown in FIG. 2*a*. This can be clearly seen in the following table.

| FIG. 3 | Hot/cold water as a percentage | Hot circuit | Cold circuit |
|---|---|---|---|
| a) | 100/0 | 100% hot water flows in the mixing path 13. 0% hot water flows through the bypass section B1. | 0% cold water flows in the mixing path 13. 100% cold water flows through the bypass section B2. |
| b) | 75/25 | 75% hot water flows in the mixing path 13. 25% hot water flows through the bypass section B1. | 25% cold water flows in the mixing path 13. 75% cold water flows through the bypass section B2. |
| c) | 50/50 | 50% hot water flows in the mixing path 13. 50% hot water flows through the bypass section B1. | 50% cold water flows in the mixing path 13. 50% cold water flows through the bypass section B2. |
| d) | 25/75 | 25% hot water flows in the mixing path 13. 75% hot water flows through the bypass section B1. | 75% cold water flows in the mixing path 13. 25% cold water flows through the bypass section B2. |
| e) | 0/100 | 0% hot water flows in the mixing path 13. 100% hot water flows through the bypass section B1. | 100% cold water flows in the mixing path 13. 0% cold water flows through the bypass section B2. |
| f) | 0/0 shut-off position, right hand | 0% hot water flows in the mixing path 13. 100% hot water flows through the bypass section B1. | 0% cold water flows in the mixing path 13. 100% cold water flows through the bypass section B2. |
| g) | 0/0 shut-off position, left hand | 0% hot water flows in the mixing path 13. 100% hot water flows through the bypass section B1. | 0% cold water flows in the mixing path 13. 100% cold water flows through the bypass section B2. |

It can be seen from this table that by setting the valve control disk 1 the total flow of the hot water flowing in the mixing path 13 and in the bypass B1 or the total flow of the cold water flowing in the mixing path 13 and in the bypass B2 always remain constant because the total superimposed surfaces of the first opening w1, k1 of the valve seat disk 2, which in each case overlap the first recess wn1, kn1 and the second recess wn2, kn2, remain constant. The superimposed surfaces of the first opening w1, k1 can each be regarded as a passage cross-section for hot water and cold water. The size of the passage cross-section is to be set as the inlet opening for water, so that the hot water and the cold water can be mixed in a suitable proportion. For example, the more hot water flows through the total cross-section, i.e. the superimposed surface of the first recess wn1 and the first opening w1 in the mixing path 13, the less hot water flows through the total cross-section of the second recess wn2 and of the first opening w1 in the bypass B1.

Furthermore, the total amount of surface, which includes the total cross-section of the first recess wn1 and the first opening w1 and the total cross-section of the first recess kn1 and the first opening k1, also remains constant. Therefore, more hot water can, for example, automatically and simultaneously flow through the second opening ma for mixing in the mixing path 13 if the cold water flow through the other second opening mb is set smaller. The same applies also for the hot water and the cold water in the bypass sections B1 and B2.

Furthermore, there are two shut-off positions (see FIGS. 3*f* and 3*g*) for this mixing device. At the shut-off positions, the hot water circuit 21 and the cold water circuit 22 are separated. This enables a mixing process to be ended by rotating the valve control disk 1 to one of the two shut-off positions. In both cases, 100% of the hot water flows through the bypass section B1 and 100% of the cold water flows through the bypass section B2. Because a shut-off setting in both directions is possible, it is not necessary to expend energy to rotate the valve control disk 1 back again at the end of a mixing process.

Figure 4A:
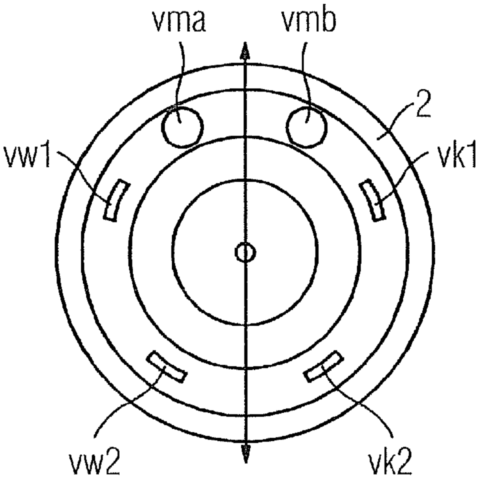
FIG. 4 shows an example of the application of the mixing device according to FIG. 2.
Figure 4B:
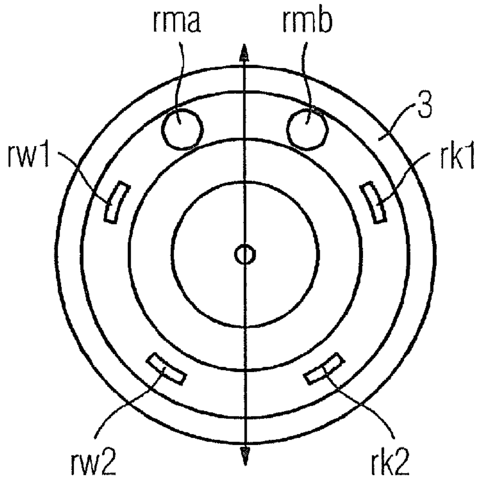
Figure 4C:
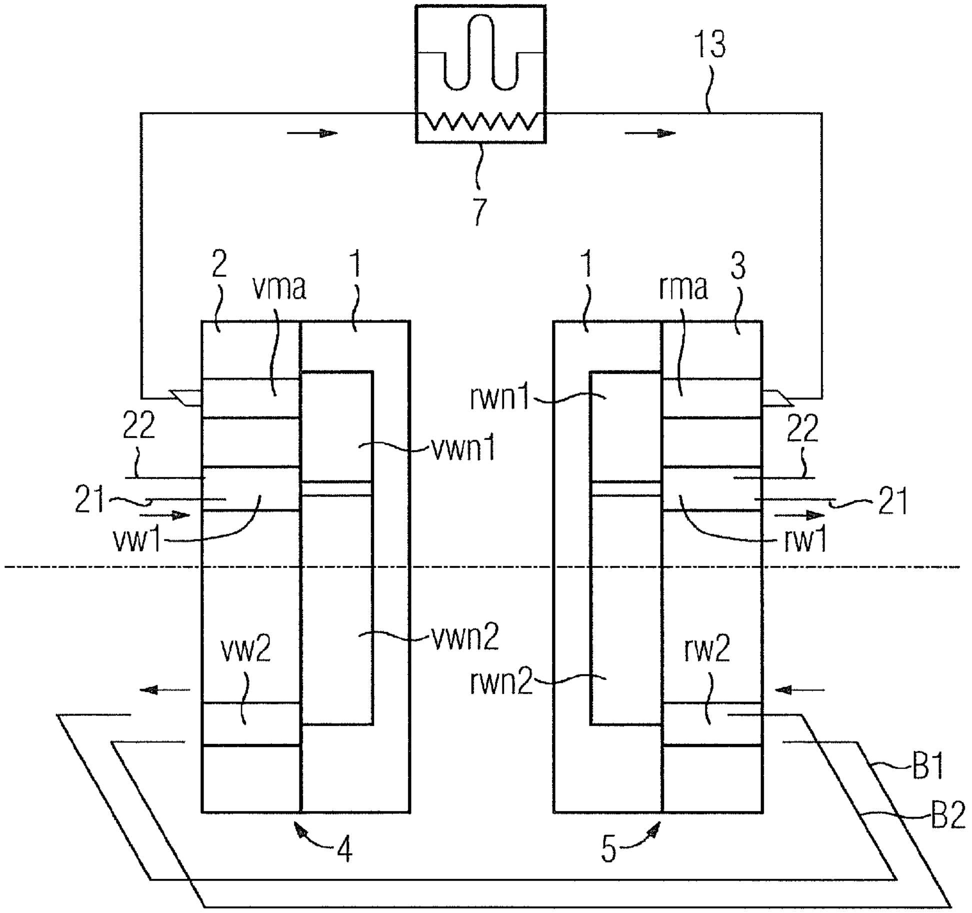

FIG. 4 shows an example of an application of a mixing device of this kind in the microreaction system shown in FIG. 4. In this case, instead of the six valves in the microreaction system shown in FIG. 1, two mixing devices 4, 5 are used in such a way that the first mixing device 4 is connected to a mixing path 13 as a supply valve and the second mixing device 5 is connected to the mixing path 13 as a return valve. The valve seat disk 2 of the supply valve 4 is shown in FIG. 4*a* and the valve seat disk 2 of the return valve 5 is shown in FIG. 4*b*. FIG. 4*c* is a schematic illustration showing the mixing device in the microreaction system connected to two water circuits 21, 22. Because of the side view of the mixing device in FIG. 4*c*, only the group of openings 11 of the valve seat disks 2, 3 and the recesses of the valve control disk 1 for hot water are shown in each case for the supply valve 4 and the return valve 5. The third openings vw2, vk2 of the supply valve 4 are each connected together as a supply opening of the bypass sections B1, B2 and the third openings rw2, rk2 of the return valve 5 are connected together as an outlet opening of the bypass sections B1, B2.

The hot water and the cold water are supplied to the first openings vw1, vw2 of the supply valve 4 and then flow in each case via the first recesses vwn1, vkn1, through the second openings rma, rmb in the mixing path 13 on one hand, or via the third openings vw2, vk3 of the supply valve 4 in the bypass section B1, B2 on the other hand. The mixed water is drawn off via the second openings rma, rmb, the first recesses rwn1, rkn1 and the third opening rw1, rk1 of the return valve 5. Furthermore, the hot water and the cold water each flow through the bypass sections B1, B2 in the third openings and then on through the second recesses rwn2, rkn2 and the first openings rw1, rk1 of the return valve 5.

The combination of two such mixing devices in conjunction with the temperature-conditioning in the micro reaction system clearly shows the advantages of such a mixing device. With these mixing devices, it is possible to mix two separate water circuits and then divide them again into equal proportions.

Figure 5A:
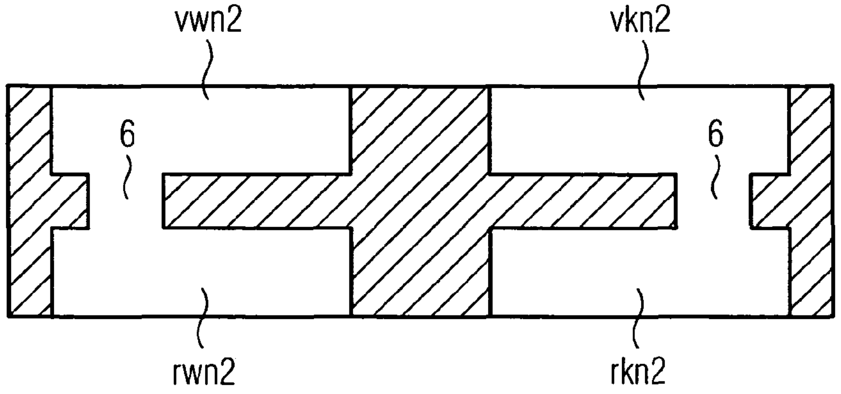
FIG. 5 shows an inventive mixing device with a valve control disk and two valve seat disks.
Figure 5B:
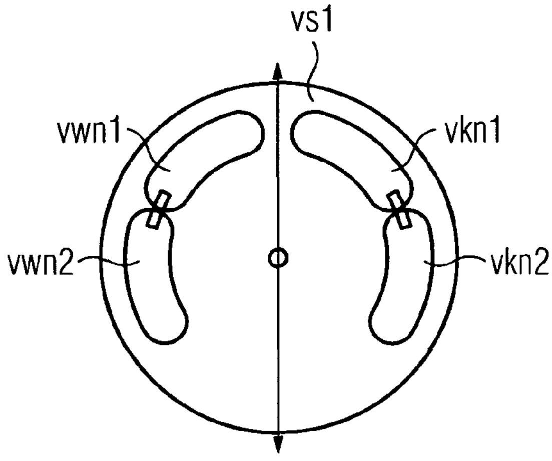
Figure 5C:
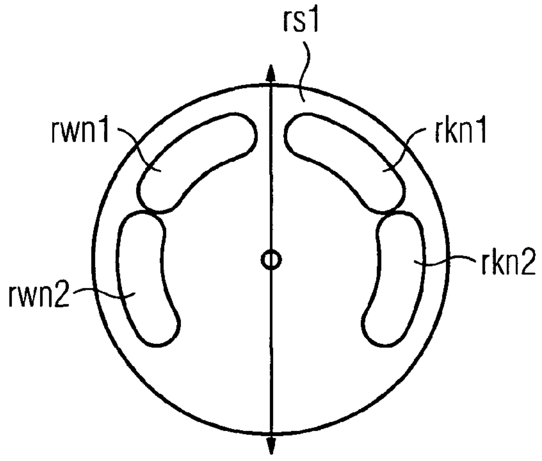

FIG. 5*a* shows a side view of a cross-section of a valve control disk 1, with this valve control disk 1 being provided with trough-shaped recesses on both sides. FIG. 5*b* shows the front side VS1 of this valve control disk 1, with two first recesses vwn1, vkn1 and two second recesses vwn2, vkn2 being shown. FIG. 5*b* shows the back RS1 of this valve control disk 1, with two first recesses rwn1, rkn1 and two second recesses, rwn2, rkn2 being shown. From this cross-section, it can be seen that in each case two of the second recesses vwn2 and rwn2 or vkn2 and rkn2, which are arranged on the front VS1 (FIG. 5*b*) and the back RS1 (FIG. 5*c*) of the valve control disk 1 respectively, are connected by a channel 6 in order to enable water to pass between the second recesses vwn2 and rwn2 or between the second recesses vkn2 and rkn2. The front VS1 of the valve control disk 1 can be used in the same way as the valve control disk 1 of the supply valve 4 shown in FIG. 4. The back RS1 of the valve control disk 1 can be used corresponding to the valve control disk 1 of the return valve 5 shown in FIG. 4.

A valve control disk 1 of this kind can be formed from two valve seat disks, which are of similar design to the valve seat disks 2, 3 shown in FIG. 2, to form a mixing device, with the three valve disks being arranged parallel to each other and pressing against each other with a specific pressure. The valve control disk 1 is arranged in parallel between the two valve seat disks 2, 3 and can be rotated relative to the other two valve seat disks 2, 3. The valve seat disks 2, 3 are held so that they cannot move. Furthermore, the front of the valve control disk 1 is arranged parallel to the valve seat disk 2 with the back of the said valve control disk 1 being arranged parallel to the valve seat disk 3.

Figure 6:
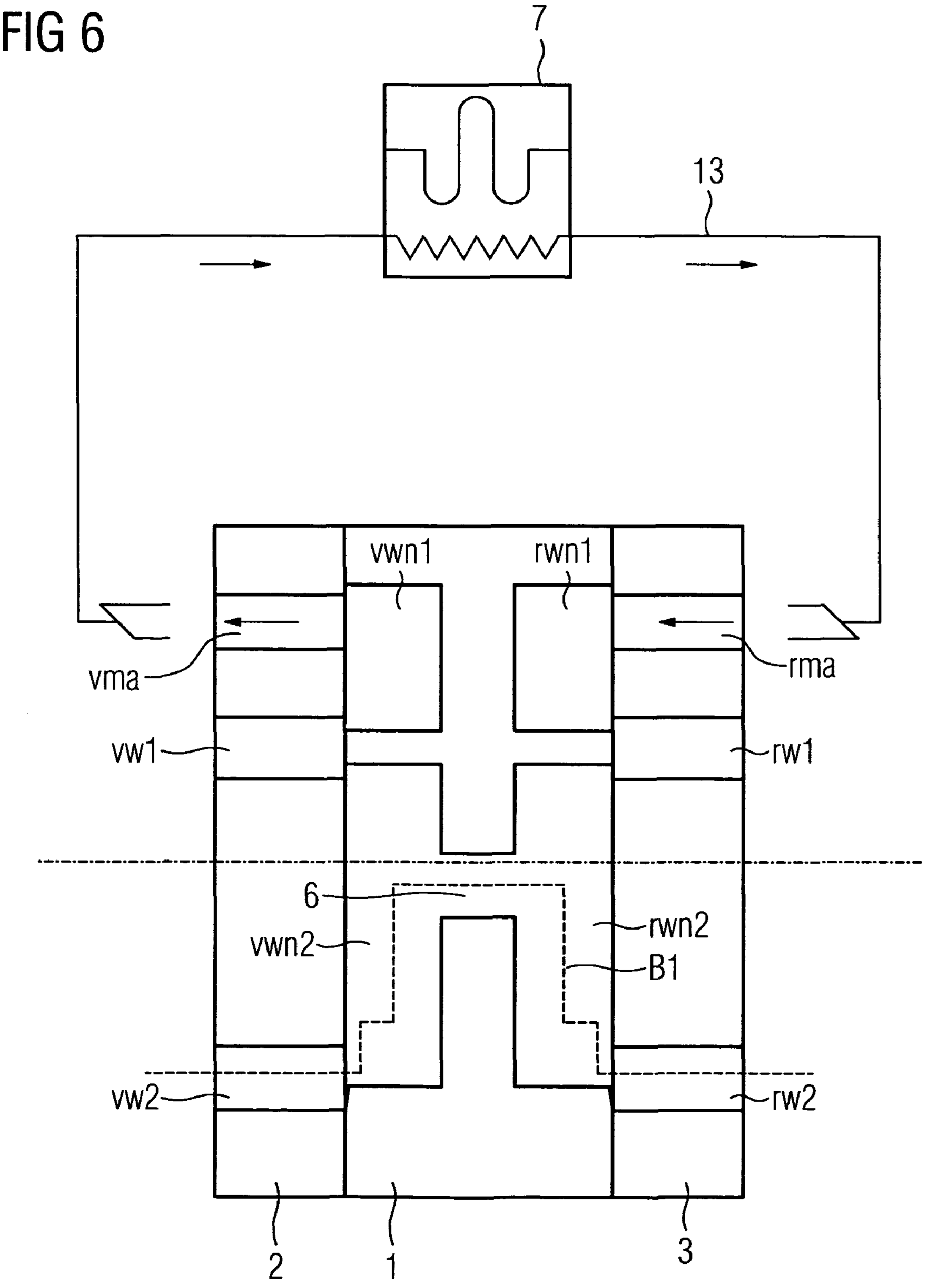
FIG. 6 shows an example of the application of the mixing device according to FIG. 5.

FIG. 6 shows an example of the application of this mixing device in a microreaction system. In this case, this mixing device can be used so that a mixing path 13 for the temperature conditioning of a reactor 7 is created by means of two valve seat disks 2, 3, with, in contrast to FIG. 4, it being possible to use the first valve seat disk 2 and the left half of the valve control disk 1 as the supply valve 4 and the second valve seat disk 3 and the right half of the valve control disk 1 as the return valve 5, i.e. the mixing path 13 and the bypass section B1, B2 can be realized just by means of this mixing device instead of using the two mixing devices in FIG. 4. The bypass section B2 is not shown in the side view of the mixing device in FIG. 6. Depending on the positions of the valve control disk 1 relative to both valve seat disks 2, 3, the hot water and the cold water are passed in a specific ratio through the mixing path 13 or the bypass section B1, B2.

The hot water and the cold water in each case are supplied to the first openings vw1 vk1 and third openings vw2,vk2 of the first valve seat disk 2. The supplied hot water and the supplied cold water in each case flows on one hand via the first recesses vwn1, vkn1 of the valve control disk 1 and out from the second openings vma, vmb of the first valve seat disk 2 into the mixing path 13, and on the other hand via the second recesses vwn2, vkn2 and the channel 6 in the second recesses rwn2, rkn2 of the valve control disk 1 and then out from the first openings rw1, rk2 and the third openings rw2, rk2 of the second valve seat disk 3 into the circuits 21, 22.

The hot water and the cold water are mixed on the mixing path 13, in order to condition the reactor 7. The mixed water is in each case supplied through the second openings rma, rmb in the second valve see disk 3 and drawn off via the first recesses rwn1, rkn1 of the valve control disk 1 through the first openings rw1, rk1 of the second valve seat disk 3. Similar to the mixing device shown in FIG. 4, for example, the flow of hot water in the mixing path 13 and in the bypass section B1 is to be determined depending on the cross-sections, which in each case are formed by the overlap of the first opening vw1 with the first recess vwn1 and with the second recess vwn2. Accordingly, the flow of cold water in the mixing path 13 and in the bypass section B2 are to be determined depending on the cross sections, which in each case are formed by the overlap of the first opening vk1 with the first recess vkn1 and with the second recess vkn2.

As shown in FIG. 3, there are also two shut-off positions for these mixing devices. If the valve control disk 1 is rotated to one of the two shut-off positions, the mixture of hot water and cold water in the mixing path 13 can be separated by means of this mixing device. In this case, 100% of the hot water flows through the bypass section B1 and 100% of the cold water through bypass section B2. Because there are two shut-off positions for the mixing device, it is not necessary for the separation of the mixture to rotate, sometimes using force, the valve control disk 1 back to a specific shut-off position.

The invention claimed is:

1. A mixing device for mixing substances, comprising:
a valve seat disk; and
a valve control disk arranged parallel to the valve seat disk that controls the mixing,
wherein the valve seat disk comprises at least two groups of openings and each group of the openings comprises at least three openings,
wherein for the each group of the openings, a first opening is an inlet opening or an outlet opening for the substances, a second opening connects to a mixing path for the substances, and a third opening bridges the mixing path,
wherein for the each group of the openings, at least one side of the valve control disk comprises a first recess between the first opening and the second opening and a second recess between the first opening and the third opening,
wherein for the each group of the openings, a flow of the substances passes via the first recess and via the second recess,
wherein for the each group of the openings, the valve control disk is set relative to the valve seat disk so that the first opening is superimposed by the first and the second recesses and a superimposed surface area of the first opening remains constant,
wherein a total superimposed surface areas of the first openings of the at least two groups of the openings superimposed by the first recesses remains constant, and
wherein a total superimposed surface areas of the first openings of the at least two groups of the openings superimposed by the second recesses remains constant.

2. The mixing device as claimed in claim 1,
wherein the mixing device comprises a first valve seat disk and a second valve seat disk,
wherein the valve control disk is arranged parallel between the first and the second valve seat disks,
wherein the valve control disk comprises two first recesses and two second recesses arranged on both sides of the valve control disk to form a passage for the each group of the openings of the first and the second valve seat disks, and
wherein the two second recesses of the valve control disk are connected to each other by a channel to form a flow between the first and the second valve seat disks.

3. The mixing device as claimed in claim 2, wherein the first and the second valve seat disks are identical and the two first recesses and the two second recesses of the valve control disk are symmetrically arranged on the both sides of the valve control disk.

4. The mixing device as claimed in claim 2,
wherein the first seat disk is an inlet to the mixing path and the second valve seat disk is an outlet to the mixing path,
wherein for the each group of the openings, the first opening, the second opening, and the third opening of the first valve seat disk is the inlet opening for the substances, and
wherein for the each group of the openings, the first opening, the second opening, and the third opening of the second valve seat disk is the outlet opening for the substances.

5. The mixing device as claimed in claim 1, wherein the mixing device comprises two shut-off positions and a flow of the substances to the mixing device bridges the mixing path at each of the two shut-off positions.

6. The mixing device as claimed in claim 1, wherein the valve control disk is moveable and adjustable.

7. The mixing device as claimed in claim 1, wherein the substances comprise liquids or gases with different temperatures.

8. The mixing device as claimed in claim 1,
wherein the mixing path is created by a first mixing device and a second mixing device,
wherein the first mixing device is an inlet to the mixing path and the second mixing device is an outlet to the mixing path,
wherein for the each group of the openings, the second opening of the first mixing device is the inlet opening for the substances and the second opening of the second mixing device is the outlet opening for the substances, and
wherein the third openings of the at least two groups of the openings of the first mixing device are connected with the corresponding third openings of the at least two groups of the openings of the second mixing device for bridging the mixing path.

* * * * *